United States Patent
Li

(10) Patent No.: US 8,424,318 B2
(45) Date of Patent: Apr. 23, 2013

(54) METHOD AND APPARATUS FOR REFRIGERANT FLOW RATE CONTROL

(75) Inventor: Jianwu Li, Louisville, KY (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 12/871,315

(22) Filed: Aug. 30, 2010

(65) Prior Publication Data

US 2012/0047914 A1 Mar. 1, 2012

(51) Int. Cl.
  *F25D 3/12* (2006.01)
(52) U.S. Cl.
  USPC .............................. 62/56; 620/190; 620/210
(58) Field of Classification Search ............. 62/56, 190, 62/210, 222, 129, 126, 441, 498, 528; 137/311, 137/331, 595, 862
  See application file for complete search history.

(56) References Cited

U.S. PATENT DOCUMENTS

| | | | |
|---|---|---|---|
| 4,325,127 A * | 4/1982 | Major | 700/282 |
| 4,403,958 A * | 9/1983 | Lohn | 433/100 |
| 4,756,166 A | 7/1988 | Tomasov | |
| 4,932,570 A * | 6/1990 | Gimpera | 222/599 |
| 5,033,272 A | 7/1991 | Yoshikawa et al. | |
| 5,129,236 A * | 7/1992 | Solomon | 62/324.1 |
| 5,174,729 A | 12/1992 | Waters et al. | |
| 5,220,225 A * | 6/1993 | Moon, Jr. | 310/87 |
| 5,465,591 A * | 11/1995 | Cur et al. | 62/439 |
| 5,502,970 A | 4/1996 | Rajendran | |
| 5,682,757 A | 11/1997 | Peterson | |
| 5,910,159 A * | 6/1999 | Matsuo et al. | 62/158 |
| 5,938,441 A * | 8/1999 | Brenner | 433/132 |
| 6,058,723 A * | 5/2000 | Kusunoki et al. | 62/156 |
| 6,058,724 A | 5/2000 | Park | |
| 6,105,377 A | 8/2000 | Jeong et al. | |
| 6,167,712 B1 | 1/2001 | Lim et al. | |
| 6,185,948 B1 * | 2/2001 | Niki et al. | 62/199 |
| 6,253,561 B1 * | 7/2001 | Imakubo | 62/198 |
| 6,321,548 B1 | 11/2001 | Clarke et al. | |
| 6,460,357 B1 * | 10/2002 | Doi et al. | 62/199 |
| 6,543,245 B1 * | 4/2003 | Waldschmidt et al. | 62/239 |
| 7,260,451 B2 | 8/2007 | Takai et al. | |
| 7,441,413 B2 | 10/2008 | Bae et al. | |
| 7,506,520 B2 | 3/2009 | Oh | |
| 7,819,179 B2 | 10/2010 | Hayashi et al. | |
| 7,918,655 B2 | 4/2011 | Hurst, Jr. et al. | |
| 8,209,991 B2 * | 7/2012 | Kondou et al. | 62/115 |
| 8,215,122 B2 | 7/2012 | Hyun et al. | |
| 2003/0089116 A1 * | 5/2003 | Heron | 62/6 |
| 2005/0103029 A1 * | 5/2005 | Kawahara et al. | 62/126 |

* cited by examiner

*Primary Examiner* — Mohammad Ali
(74) *Attorney, Agent, or Firm* — Global Patent Operation; Douglas D. Zhang

(57) ABSTRACT

Method and apparatus for refrigerant flow control are disclosed. One exemplary apparatus for controlling refrigerant flow comprises: at least one refrigerant inlet; at least one refrigerant outlet; a first valve coupled between the refrigerant inlet and the refrigerant outlet; and a second valve coupled between the refrigerant inlet and the refrigerant outlet; wherein at least one of the first valve and the second valve is rotatable, and the first valve and the second valve comprise one or more cooperative openings to allow refrigerant to pass from the refrigerant inlet, through the first and second valves, and out of the refrigerant outlet.

20 Claims, 10 Drawing Sheets

METHOD AND APPARATUS FOR REFRIGERANT FLOW RATE CONTROL

BACKGROUND OF THE INVENTION

The subject matter disclosed herein relates to refrigerator appliances, and more particularly to controlling the flow of a refrigerant in such a refrigerator appliance.

Many existing refrigerator appliances are based on a vapor-compression refrigeration technique. In such a refrigeration technique, a refrigerant serves as the medium that absorbs and removes heat from the space to be cooled, and transfers the heat elsewhere for expulsion. A refrigeration system that performs such a technique typically utilizes some type of refrigerant flow mechanism to control the flow of the refrigerant through the system.

For example, in medium and large sized refrigeration units such as commercial air conditioners and commercial ice makers, a thermal expansion valve is typically used to regulate the flow of the refrigerant. For a household refrigerator, a capillary tube is typically used to regulate the refrigerant flow. This is because the refrigerant flow rate in a household refrigerator is relatively small, as compared to commercial refrigeration units.

However, a capillary tube has a fixed diameter and fixed length, and therefore can only provide a fixed refrigerant flow rate at a fixed pressure. That is, once designed, the refrigerant flow rate of a refrigerator using a capillary tube can not be adjusted without varying the compressor speed. If the operating conditions of the refrigerator diverge from the designed operating condition for which a particular capillary tube has been selected, then the performance and energy consumption of the refrigerator are compromised.

Some refrigerator appliances are designed to have two separate evaporators, for example, one serving as an evaporator in a freezer compartment of the refrigerator (i.e., a freezer evaporator) and the other serving as an evaporator in a fresh food compartment of the refrigerator (i.e., a fresh food evaporator). The evaporator is the part of the refrigeration system through which the refrigerant passes to absorb and remove the heat in the compartment being cooled (e.g., freezer compartment or fresh food compartment).

In such dual evaporator refrigeration systems, a three-way valve has been used to control refrigerant flow. Such a three-way valve has one input port and two output ports, wherein the outputs are respectively coupled to the evaporators. However, there is no ability to control the flow rate into each evaporator with the three-way valve. Rather, only flow direction can be controlled by turning the refrigerant flow on or off for each of the evaporators, i.e., by fully opening and fully closing the output ports of the three-way valve.

BRIEF DESCRIPTION OF THE INVENTION

As described herein, the exemplary embodiments of the present invention overcome one or more disadvantages known in the art.

One aspect of the present invention relates to an apparatus for controlling refrigerant flow, comprising: at least one refrigerant inlet; at least one refrigerant outlet; a first valve coupled between the refrigerant inlet and the refrigerant outlet; and a second valve coupled between the refrigerant inlet and the refrigerant outlet; wherein at least one of the first valve and the second valve is rotatable, and the first valve and the second valve comprise one or more cooperative openings to allow refrigerant to pass from the refrigerant inlet, through the first and second valves, and out of the refrigerant outlet.

Another aspect of the present invention relates to a refrigerator appliance, comprising a refrigerant flow control device comprising: at least one refrigerant inlet; at least one refrigerant outlet; a first valve coupled between the refrigerant inlet and the refrigerant outlet; and a second valve coupled between the refrigerant inlet and the refrigerant outlet; wherein at least one of the first valve and the second valve is rotatable, and the first valve and the second valve comprise one or more cooperative openings to allow refrigerant to pass from the refrigerant inlet, through the first and second valves, and out of the refrigerant outlet. The refrigerator appliance also comprises a mechanism for rotating at least one of the first valve and the second valve in response to a control signal.

Yet another aspect of the present invention relates to a method of controlling a flow of a refrigerant in an appliance comprising directing a rotary valve to one or more flow rate operating positions in relation to a stationary valve, wherein the rotary valve and the stationary valve comprise one or more cooperative openings to allow refrigerant to pass from a refrigerant inlet, through the rotary and stationary valves, and out of a refrigerant outlet so as to provide one or more refrigerant flow rates.

Advantageously, illustrative techniques of the present invention provide for refrigerant flow control regulation from about one hundred percent to about zero percent in a continuous manner or in a predetermined step size manner. Thus, intermediate flow rates between about one hundred percent and about zero percent are realized.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

One or more of the embodiments of the invention will be described below in the context of a refrigerator appliance such as a household refrigerator. However, it is to be understood that methods and apparatus of the invention are not intended to be limited to use in household refrigerators. Rather, methods and apparatus of the invention may be applied to and deployed in any other suitable environments in which it would be desirable to control refrigerant flow rate in an accurate and linear manner.

Figure 1:
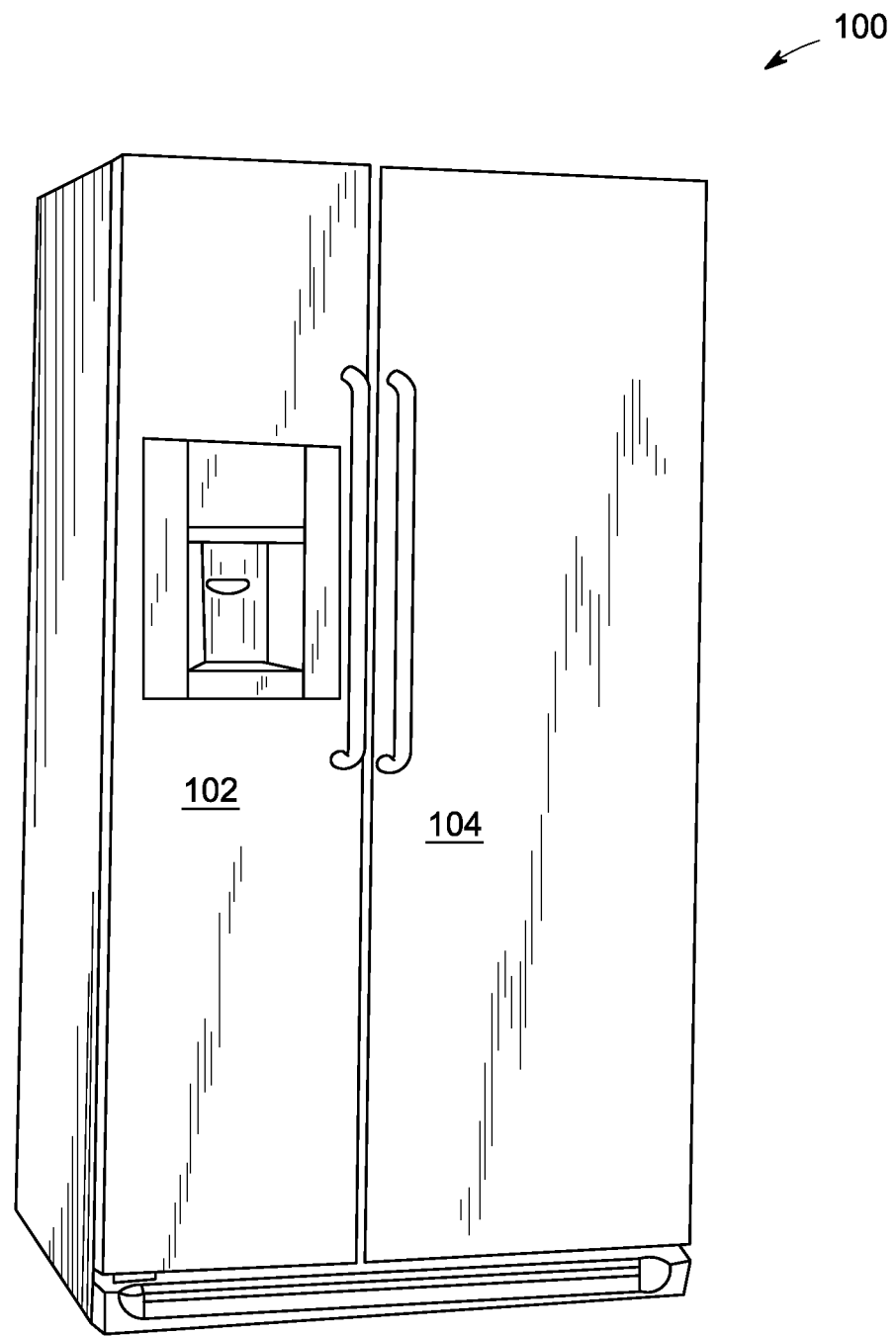
FIG. 1 is a diagram of a refrigerator, in accordance with an embodiment of the invention.

FIG. 1 illustrates an exemplary refrigerator appliance 100 within which refrigerant flow control embodiments of the invention may be implemented. As is typical, a refrigerator has a freezer portion 102 and a refrigerator portion 104. The refrigerator portion typically maintains foods and products stored therein at temperatures at or below about 40 degrees Fahrenheit in order to preserve the items therein, and the freezer portion typically maintains foods and products at temperatures below about 32 degrees Fahrenheit in order to freeze the items therein.

The refrigerator portion 104 may also be referred to as a fresh food compartment, while the freezer portion 102 may be referred to as a freezer compartment. In some refrigerator appliances, a dual evaporator system is used whereby one evaporator is used to cool the freezer compartment and another evaporator is used to cool the fresh food compartment.

While the exemplary refrigerator 100 in FIG. 1 illustrates the freezer portion 102 and the refrigerator portion 104 in a side-by-side configuration, it is to be understood that other configurations are known, such as top freezer configurations where the freezer portion 102 is situated on top of the refrigerator portion 104, and bottom freezer configurations where the freezer portion 102 is situated below the refrigerator portion 104. Also, viewing the refrigerator 100 from the front, the freezer portion 102 may be located to the right of the refrigerator portion 104, as opposed to being located to the left as shown in FIG. 1.

It is to be appreciated that refrigerant flow control embodiments of the invention may be implemented in the refrigerator 100. However, methods and apparatus of the invention are not intended to be limited to implementation in a refrigerator such as the one depicted in FIG. 1. That is, the inventive methods and apparatus may be implemented in other household refrigerator appliances, as well as non-household (e.g., commercial) refrigerator appliances. Furthermore, such inventive methods and apparatus may be generally implemented in any appropriate refrigeration or refrigerant-based system.

Illustrative principles of the invention provide refrigerant flow control mechanisms that can be used to provide refrigerant flow control that is more accurate and linear than existing refrigerant flow control mechanisms. While the refrigerant flow control mechanisms of the invention, as illustratively described herein, are particularly well-suited for operation under the control of a digital microprocessor, it is to be understood that the principles of the invention are not intended to be limited to digital implementations.

As will be explained below, illustrative embodiments provide for a refrigerant flow control device that has both a rotary valve and a stationary valve. The rotary valve and/or the stationary valve may have one or more openings (by way of example only, slot features and/or hole features) formed therein that create the ability to selectively manage the flow rate of refrigerant in the refrigeration system (e.g., into the evaporator) in an accurate and linear manner. As will be seen, illustrative principles of the invention provide for flow control devices with a single inlet and a single outlet, flow control devices with a single inlet and multiple outlets, and flow control devices with multiple inlets and multiple outlets.

Furthermore, such inventive refrigerant control devices can regulate flow rate from about 100 percent to about 0 percent in a continuous manner or in a predetermined step size manner. Thus, intermediate flow rates between 100 percent and 0 percent are realized. When implemented in a refrigerator appliance, such inventive devices enable direct temperature control of evaporators by microprocessors. The microprocessor, as will be explained further, can adjust the flow rate in real time based on local operating conditions to ensure that the refrigeration system operates at an optimal point, thus improving system performance and reducing energy consumption.

Prior to describing refrigerant flow control devices according to illustrative embodiments of the invention (which will be done in the context of FIGS. 3-11), a description will first be given (in the context of FIG. 2) of one embodiment of a vapor-compression refrigeration system in which one or more of the inventive refrigerant flow control devices may be employed.

Figure 2:
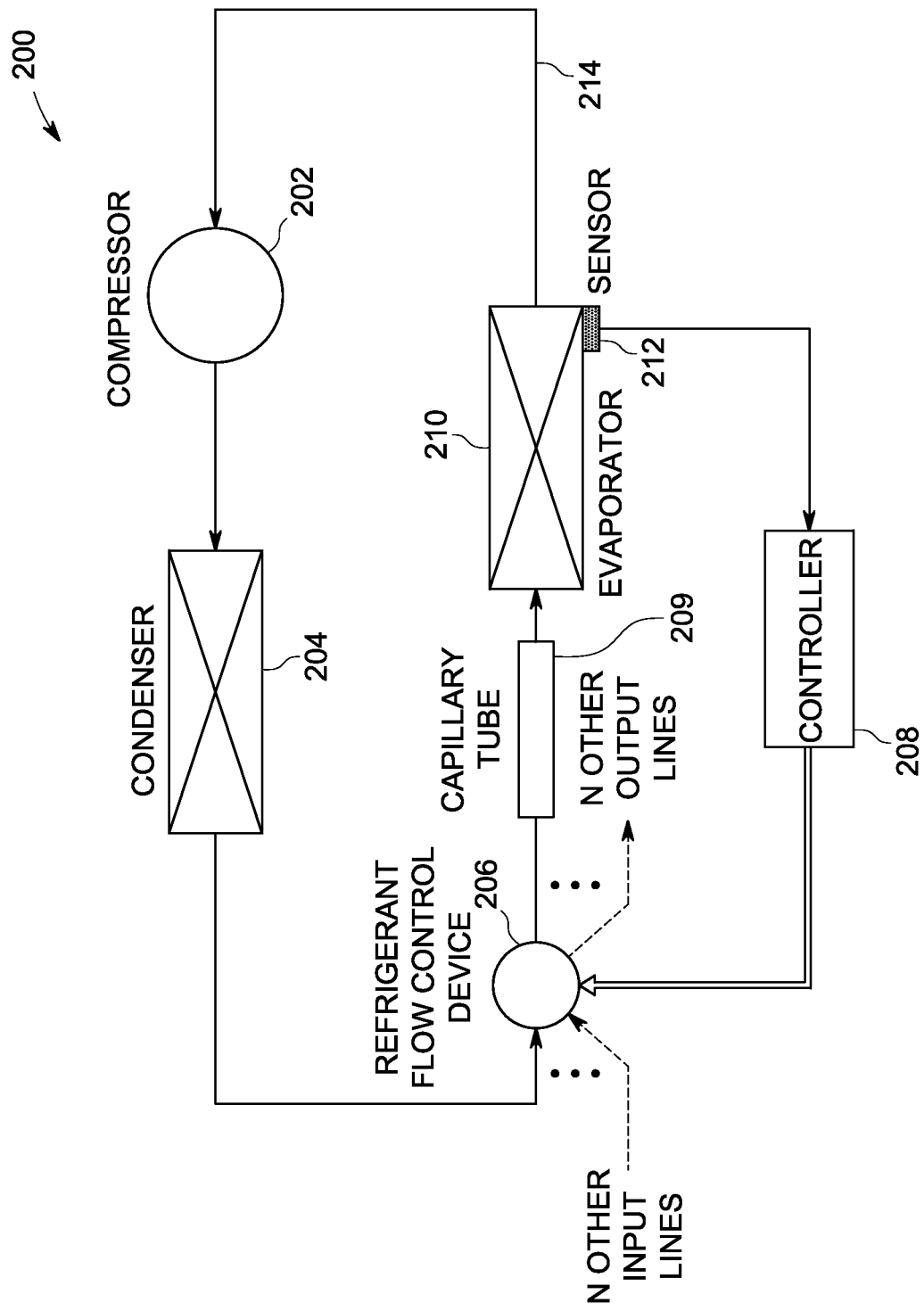
FIG. 2 is a diagram of a vapor-compression refrigeration system, in accordance with an embodiment of the invention.

FIG. 2 is a diagram of a vapor-compression refrigeration system, in accordance with one embodiment of the invention. It is to be understood that one or more refrigerant flow control devices of the invention may be employed in the vapor-compression refrigeration system 200 of FIG. 2. Further, the vapor-compression refrigeration system 200 may be employed in refrigerator 100 of FIG. 1.

The vapor-compression refrigeration system uses a circulating refrigerant as the medium which absorbs and removes heat from the compartment or compartments to be cooled and subsequently expels the heat elsewhere. A refrigerant is a compound used in a heat cycle that reversibly undergoes a phase change from a gas to a liquid. Examples of refrigerants used in refrigerator appliances include but are not limited to the R-12, R-22, and R-134a. While certain older refrigerants are being phased out and replaced by environmentally-friendlier compounds, it is to be understood that the principles of the invention are not limited to any particular refrigerant.

As shown in FIG. 2, circulating refrigerant enters a compressor 202 in a thermodynamic state known as a "saturated vapor" and is compressed to a higher pressure in the compressor 202, resulting in a higher temperature as well. The hot, compressed vapor exiting the compressor 202 is then in a thermodynamic state known as a "superheated vapor," i.e., it is at a temperature and pressure at which it can typically be condensed with available cooling water or cooling air. Thus, the hot vapor is routed through a condenser 204 where it is cooled and condensed into a liquid by flowing through a coil or tubes with cool water or cool air flowing across the coil or tubes of the condenser. The cool air may typically be air in the room in which the refrigerator operates. It is to be understood that the condenser 204 is where the circulating refrigerant rejects heat from the system and the rejected heat is carried away by either the water or the air (dependent on which one the condenser uses).

The condensed liquid refrigerant, in a thermodynamic state known as a "saturated liquid," is next routed to a refrigerant flow control device 206. It is to be appreciated that refrigerant flow control device 206 is one of the inventive refrigerant control devices of the invention to be described below in detail. Refrigerant flow control device 206 accurately and linearly controls the flow rate of the refrigerant, and flow direction when it includes multiple outlets. The device 206 is under the programmatic control of a refrigerant flow controller 208. In one embodiment, refrigerant flow controller 208 is a digital microprocessor.

As mentioned above, a refrigerant flow control device of the invention may have a single inlet and a single outlet, a single inlet and multiple outlets, and multiple inlets and multiple outlets. As illustrated in FIG. 2, the refrigerant flow control device 206 is shown having a single input (inlet) connected to the condenser 204 and a single output (outlet) connected to evaporator 210. However, as intended to be depicted by the dashed lines entering and exiting the device 206, it is to be appreciated that, in other embodiments, the device 206 may have multiple outputs (e.g., N where N equals 2 or more) respectively connected to multiple evaporators all fed from a single input, or multiple inputs (e.g., N where N equals 2 or more) connected to condenser 204 or other condensers wherein the multiple inputs feed multiple outputs and thus multiple evaporators. For example, one evaporator may be located in the freezer compartment of refrigerator 100 in FIG. 1, while another evaporator may be located in the fresh food compartment of the refrigerator 100.

Thus, when the refrigerant flow control device 206 includes one inlet from the condenser 204 and two outlets, one connected to one evaporator (e.g., evaporator 210) and the other connected to another evaporator (not expressly shown), then it is considered to be operating as a three-way valve. As such, it is to be understood that one or more of the inventive refrigerant flow control devices described herein may be utilized in the dual evaporator refrigeration system described in the U.S. patent application Ser. No. 12/871,467, entitled "Method and Apparatus for Controlling Refrigerant Flow," filed concurrently herewith, the disclosure of which is incorporated by reference herein in its entirety.

As shown in FIG. 2, before entering the evaporator 210 after leaving the refrigerant flow control device 206, the refrigerant passes through an expansion valve in the form of a capillary tube 209. The refrigerant undergoes an abrupt reduction in pressure in the capillary tube. That pressure reduction results in the flash evaporation of a part of the liquid refrigerant. The so-called "auto-refrigeration" effect of the flash evaporation lowers the temperature of the liquid and vapor refrigerant mixture to where it is colder than the temperature of the enclosed compartment to be refrigerated. The refrigerant flow control device 206 can function like an expansion valve as well. Theoretically, the capillary tube 209 in FIG. 2 can be removed to complete a refrigeration cycle. However, the capillary tube 209 provides the opportunity to cool the refrigerant before entering the evaporator by bonding the capillary tube 209 with the return line 214 between evaporator 210 and compressor 202 in FIG. 2. This is a common practice in the refrigeration industry. The capillary tube 209 can help to shift the range of the refrigerant flow control device 206 as well. Therefore, a capillary tube 209 is still preferred.

The cold mixture is then routed through a coil or tubes in the evaporator 210. In the compartment to be cooled by the evaporator, a fan (not expressly shown) circulates the warm air in the enclosed compartment across the coil or tubes of the evaporator carrying the cold refrigerant liquid and vapor mixture. The warm air evaporates the liquid part of the cold refrigerant mixture. At the same time, the circulating air is cooled and thus lowers the temperature of the enclosed compartment to a desired temperature. It is to be understood that the evaporator is where the circulating refrigerant absorbs and removes heat which is subsequently rejected in the condenser and transferred elsewhere by the water or air used in the condenser. To complete the refrigeration cycle, the refrigerant vapor exits the evaporator 210, again as a "saturated vapor," and is routed back into the compressor 202 to start a new cycle.

Note that a temperature sensor located in the compartment to be cooled measures and reports the temperature in the compartment. In some applications, another temperature sensor located in the evaporator measures and reports the temperature of the evaporator. Depending on the control logic, either temperature sensor or both temperature sensors can be used to feed temperature information to controller 208. For simplification, either temperature sensor or both temperature sensors is referred to as temperature sensor 212. A signal is sent by the sensor 212 to the refrigerant flow controller 208 (which in an electronic refrigerator system may be a microprocessor) indicative of the temperature (i.e., containing the temperature reading) in the compartment. As will be further explained below, the controller 208 then sends a signal to the refrigerant flow control device 206 to direct it to certain operating positions. These operating positions will be described in detail below. In general, it is to be understood that the operating positions affect the flow rate of the refrigerant to the evaporator such that the temperature in the compartment being cooled can be closely controlled and thus maintained or adjusted. In multiple outlet embodiments, the flow direction of the refrigerant is also controlled via the operating positions.

Note that in addition to the sensor 212, other sensors can also provide other signals indicative of other operating and/or environmental conditions to the controller 208.

Figure 3:
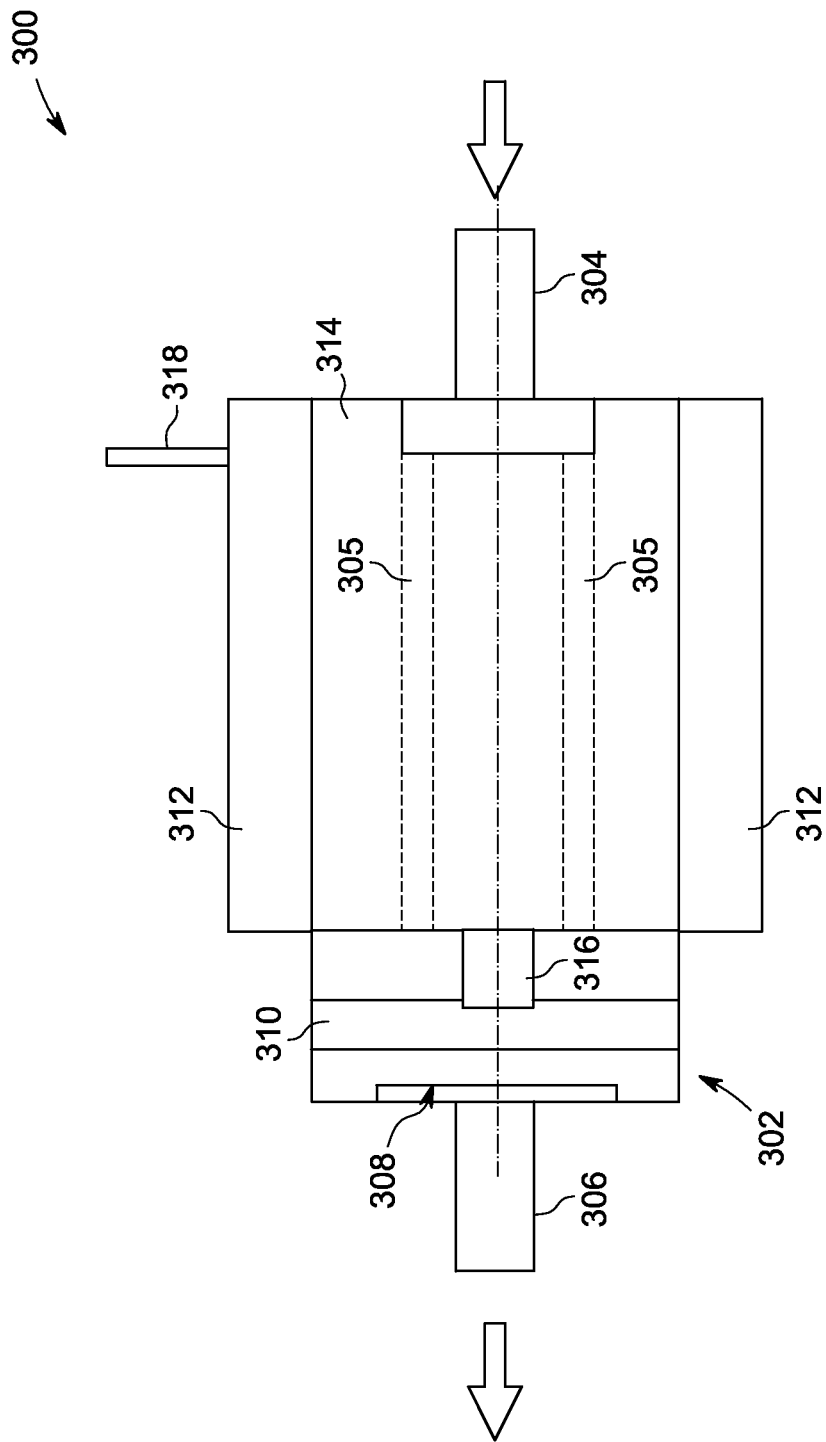
FIG. 3 is a diagram of a refrigerant flow control device, in accordance with an embodiment of the invention.

Turning now to FIG. 3, a refrigerant flow control device 300 is shown according to one embodiment of the invention. It is to be appreciated that the device 300 can be employed in the vapor-compression refrigeration system 200 in FIG. 2 as the refrigerant flow control device 206. In this embodiment, the device 300 operates with a single inlet and a single outlet.

As shown, the refrigerant flow control device 300 includes a housing 302 with an inlet 304 entering the housing 302 and an outlet 306 exiting the housing 302. Since the inlet 304 and the outlet 306 are formed along the same axial centerline passing through the housing, device 300 may be referred to as an "inline design." The inlet 304 and the outlet 306 are connected via one or more through holes 305.

The device 300 also includes a stationary valve 308 and a rotary valve 310. As mentioned above and as will be further explained below in the context of FIG. 4, the rotary valve and/or the stationary valve may have one or more openings (by way of example only, slot features and/or hole features) formed therein that create the ability to selectively manage the flow rate of refrigerant in the refrigeration system (e.g., into the evaporator) in an accurate and linear manner. As will be seen, based on the complementary patterns of openings formed on the stationary valve and/or the rotary valve, as the rotary valve rotates, refrigerant flows from the inlet 304 to the outlet 306 via the through holes 305, passing out of the outlet 306 at a flow rate corresponding to the selectively controlled operating positioning of the rotary valve with respect to the stationary valve.

The device 300 also includes a step motor 312, a motor rotor 314, and a spring-loaded shaft 316 for cooperatively driving the rotary valve 310 to selected operating positions in response to one or more control signals sent by a microprocessor (e.g., the refrigerant flow controller 208 in FIG. 2) and received at control signal terminal 318.

Figure 4B:
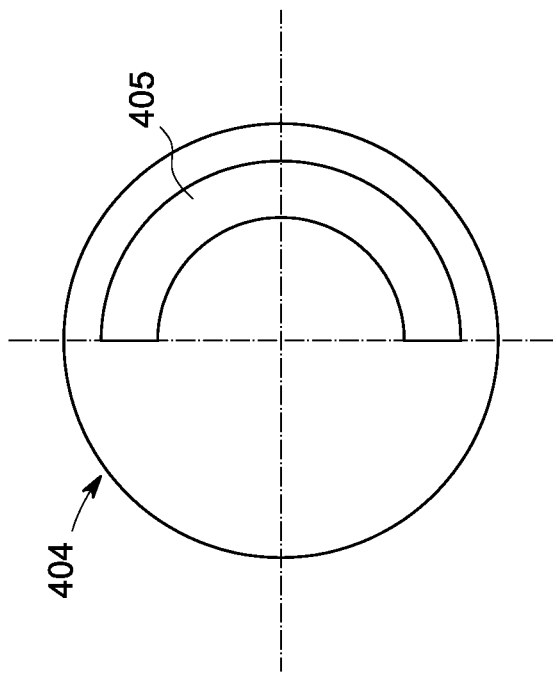
FIG. 4 is a diagram of a stationary valve and a rotary valve, in accordance with an embodiment of the invention.
Figure 4A:
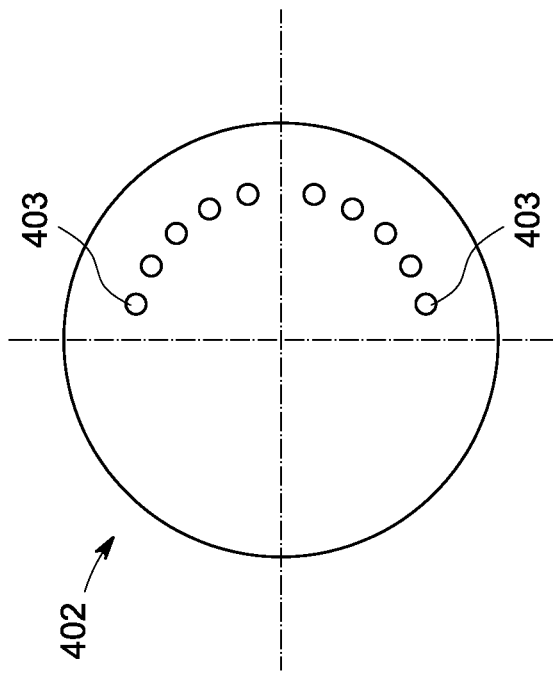
Figure 5B:
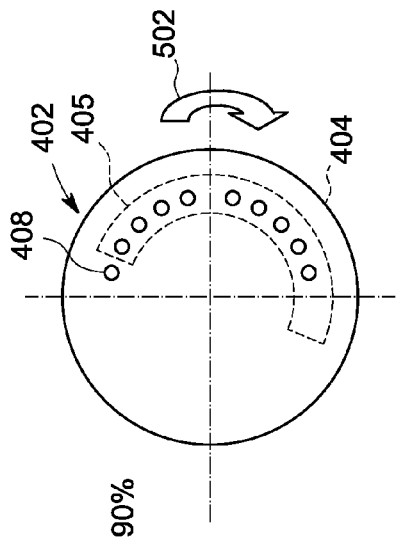
FIG. 5 is a diagram of exemplary operating positions of a rotary valve, in accordance with an embodiment of the invention.
Figure 5D:
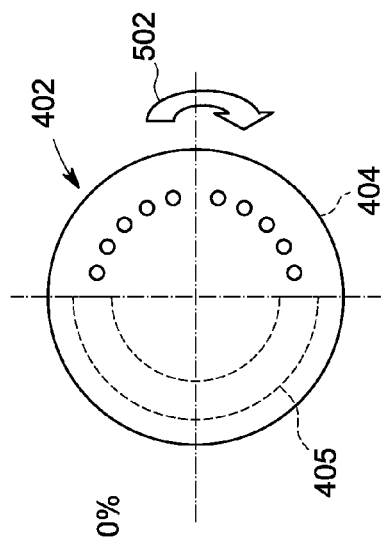
Figure 5A:
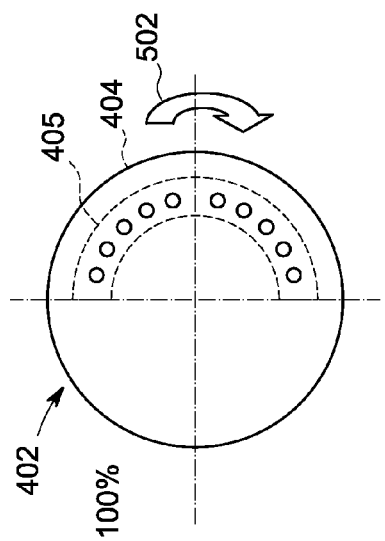
Figure 5C:
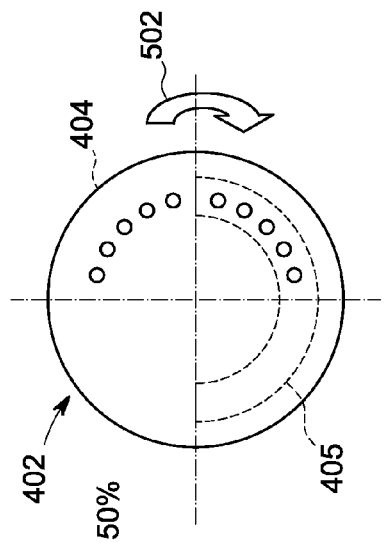

FIG. 4 illustrates an embodiment of a stationary valve 402 in view 4(A) (corresponding to 308 in FIG. 3), and a rotary valve 404 in view 4(B) (corresponding to 310 in FIG. 3). Note that the view of the two valves in FIG. 4 is taken looking into the outlet 306 along the axial centerline in FIG. 3.

As shown, the stationary valve 402, in this embodiment, has a plurality of holes 403 formed in the otherwise solid body of the valve; in this case, ten holes forming a semicircle. The rotary valve 404, in this embodiment, has a slot 405 formed in the otherwise solid body of the valve; in this case forming a semicircle. It is to be appreciated that, in an alternative embodiment, the holes 403 could be formed on the rotary valve 404 and the slot 405 formed on the stationary valve 402.

Referring back to FIG. 3, it is to be noted that the rotary valve 310 (404 in FIG. 4) is coupled to the spring-loaded shaft 316, which is rotationally driven by the motor rotor 314 in response to a control signal being received by the step motor 312 at terminal 318. As shown in FIG. 3, the rotary valve 310 is positioned directly behind and in close proximity with the stationary valve 308 (402 in FIG. 4); although the positions of the two valves could be reversed in alternate embodiments. The rotary valve is positioned close enough to the stationary valve such that the rotary valve can freely rotate but the desired amount of refrigerant passes through the opening of the rotary valve and through the openings of the stationary valve.

A refrigerant flow control device with valves 402 and 404 operates as follows. Reference will be made here to FIG. 5 with views A through D, as well as back to FIGS. 2, 3 and 4. Again, the views in FIG. 5 are taken looking into the outlet 306 along the axial centerline in FIG. 3.

The refrigerant flow controller 208 sends a signal to the step motor 312. Recall that this signal is generated in response to temperature feedback provided by the sensor 212. Note that, in one embodiment, the controller 208 is a microprocessor or central processing unit (CPU) whose function is controlled by suitable software or firmware programmed to implement the inventive refrigerant flow control techniques described herein. Further, in one embodiment, the step motor 312 receives a signal from the controller 208 containing a predetermined number of pulses that correspond to how many steps the motor is to take. However, other forms of control signals that are known to those ordinarily skilled in the art may be employed. Recall that the rotary valve 310 of the device 300 is operatively coupled to the shaft 316 of the motor rotor 314 such that, as the shaft of the step motor rotates in stepping motion, the rotary valve 310 moves to the various operating positions, while the stationary valve 308 remains in place. This rotary valve/stationary valve positional interplay allows the slot 405 in the rotary valve to selectively align with the plurality of holes 403 in the stationary valve. This positional interplay provides improved flow rate control as will now be explained in the context of FIG. 5.

Referring to view 5(A) in FIG. 5, it is illustrated that rotary valve 404 is positioned with respect to stationary valve 402 such that the slot 405 in the rotary valve is fully aligned with the plurality of holes 403 in the stationary valve. In this manner, refrigerant entering the inlet 304 of the device 300 will pass through the device housing 302 (via the through holes 305) and through the slot 405 of the rotary valve 404. Because the slot 405 is fully aligned with the plurality of holes 403, refrigerant passes through all of the holes and out of the outlet 306 of the device (and onto the evaporator). This exemplary operating position in view 5(A) corresponds to a 100 percent flow rate.

View 5(B) illustrates another exemplary operating position. It is assumed that the controller 208 sends a signal to the step motor 312 to rotate the rotary valve 404 in a clockwise direction 502 such that the slot 405 is no longer fully aligned with the plurality of holes 403 in the stationary valve 402. In this position, it is shown that the slot 405 has moved such that the solid portion of the rotary valve covers one of the holes 403 (covered hole denoted as 408) of the stationary valve thus allowing refrigerant to pass through the stationary valve via only 9 of the 10 holes. In view 5(B), the operating position thus corresponds to a 90 percent flow rate (9 of the 10 holes are opened). Advantageously, given the number of holes covered versus the number of holes opened, the percentage of refrigerant flow out of the outlet 306 can be selectively regulated between 100 percent and 0 percent.

View 5(C) illustrates yet another exemplary operating position. Again, it is assumed that the controller 208 sends a signal to the step motor 312 to rotate the rotary valve 404 in the clockwise direction 502 such that the slot 405 moves causing the solid portion of the rotary valve to cover half of the holes 403 of the stationary valve thus allowing refrigerant to pass through the stationary valve via only 5 of the 10 holes. Thus, in view 5(C), the operating position corresponds to a 50 percent flow rate (5 of the 10 holes are opened).

View 5(D) illustrates a further exemplary operating position. Once again, it is assumed that the controller 208 sends a signal to the step motor 312 to rotate the rotary valve 404 in the clockwise direction 502 such that the slot 405 moves, this time causing the solid portion of the rotary valve to cover all of the holes 403 of the stationary valve. This allows substantially no refrigerant to pass through the stationary valve since all the holes are covered. Thus, in view 5(D), the operating position corresponds to a 0 percent flow rate (0 of the 10 holes are opened).

Thus, by moving the rotary valve 404 in relation to the fixed position of the stationary valve 402, thus exposing and covering different numbers of openings in the stationary valve, different percentages of flow rate are achieved under programmatic control of the controller 208.

It is to be appreciated that principles of the invention are not limited to any particular number of holes formed in the stationary valve, and thus more or less holes may be formed in the stationary valve so as to provide a finer flow rate resolution. And, again, recall that the features formed on each of the valves can be swapped (exchanged) and still provide the same advantageous operations as described above. Further, shapes other than circular holes and curved slots, as shown here, may be employed.

Note also that the embodiment shown in FIGS. 4 and 5 for the rotary and stationary valves is considered a predetermined step based flow rate regulation. Other embodiments described below provide for a continuous based flow rate regulation.

Figure 6:
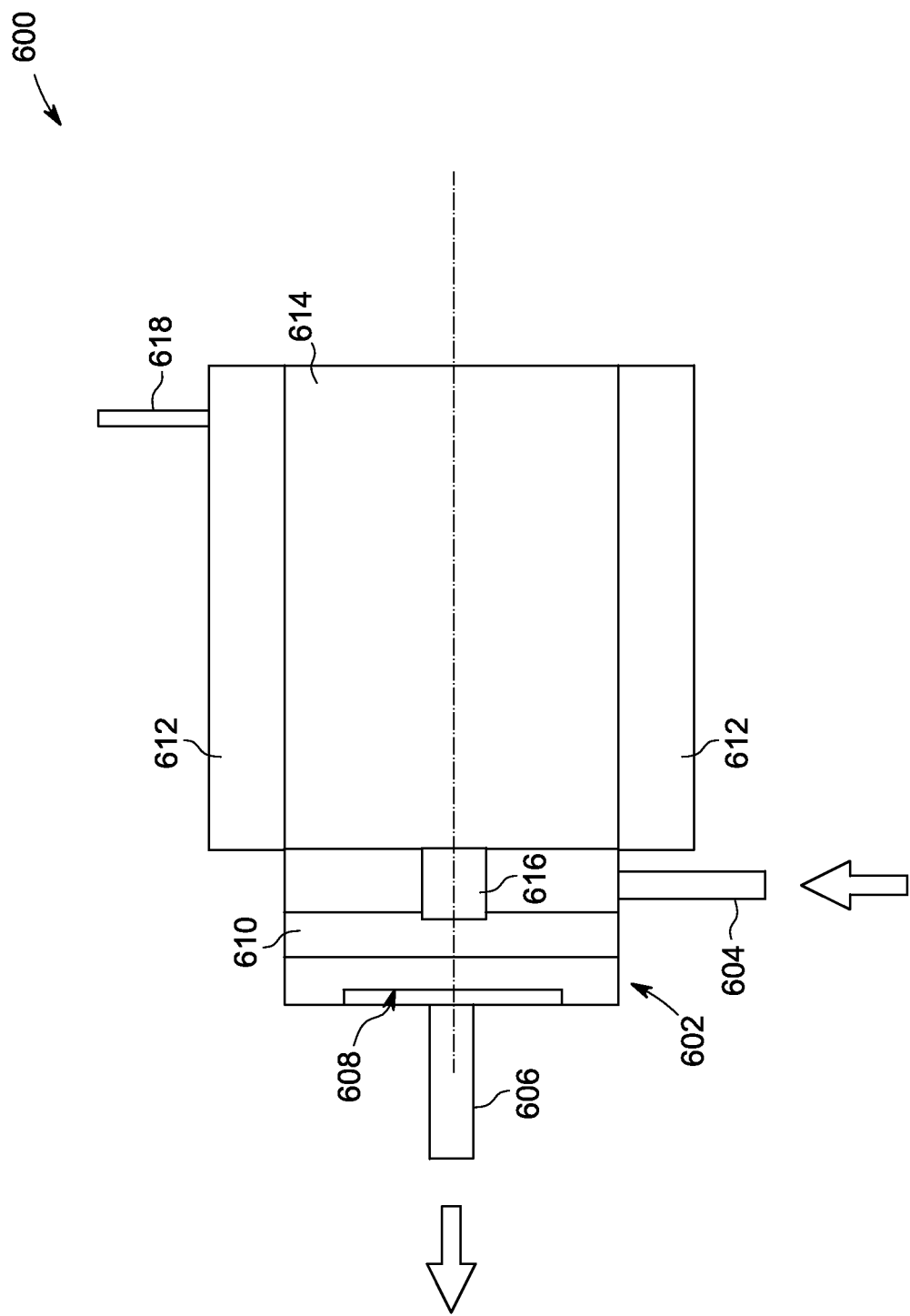
FIG. 6 is a diagram of a refrigerant flow control device, in accordance with another embodiment of the invention.

Referring now to FIG. 6, a refrigerant flow control device 600 is shown according to another embodiment of the invention. It is to be appreciated that device 600 can also be employed in the vapor-compression refrigeration system 200 in FIG. 2 as the refrigerant flow control device 206. In this embodiment, the device again operates with a single inlet and a single outlet. However, this is referred to as a "T shape design," since the outlet is perpendicularly positioned with respect to the outlet.

Note that the components of the device 600 have the same or similar functions as the components of the device 300 in FIG. 3. Thus, the reference numerals of the components in FIG. 6 correspond to the reference numerals of the components in FIG. 3 but are incremented by 300 (thus housing 602 corresponds to housing 302, inlet 604 corresponds to inlet 304, and so on).

Note also that the operations of the stationary valve 608 and the rotary valve 610 of the device 600 are the same or similar to the operations described above with respect to FIGS. 4 and 5. The only difference is that refrigerant comes into the device at an angle perpendicular to the axial centerline of the device rather than along the axial centerline as in the device 300 of FIG. 3. This embodiment in FIG. 6 may be utilized when a physical mounting of the device in the refrigerator appliance warrants a T shape inlet/outlet relationship.

Figure 7:
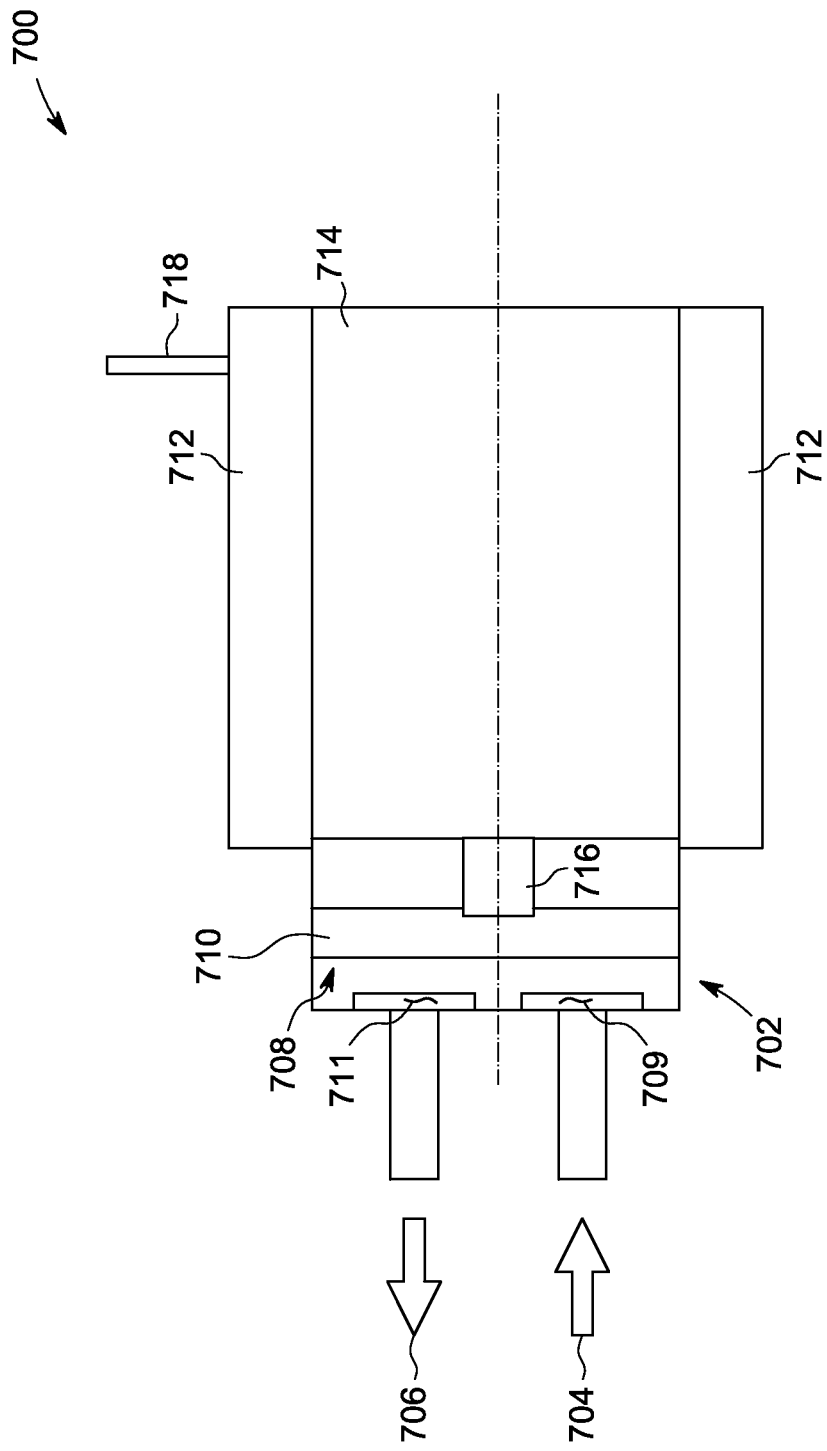
FIG. 7 is a diagram of a refrigerant flow control device, in accordance with yet another embodiment of the invention.

Referring now to FIG. 7, a refrigerant flow control device 700 is shown according to another embodiment of the invention. It is to be appreciated that device 700 can also be employed in the vapor-compression refrigeration system 200 in FIG. 2 as the refrigerant flow control device 206. In this embodiment, the device again operates with a single inlet and a single outlet. However, this is referred to as a "single ended design," since the outlet and inlet are both positioned on one side of the device housing.

Note that the components of the device 700 have the same or similar functions as the components of the device 300 in FIG. 3. Thus, the reference numerals of the components in FIG. 7 correspond to the reference numerals of the components in FIG. 3 but are incremented by 400 (thus housing 702 corresponds to housing 302, inlet 704 corresponds to inlet 304, and so on).

Figure 8B:
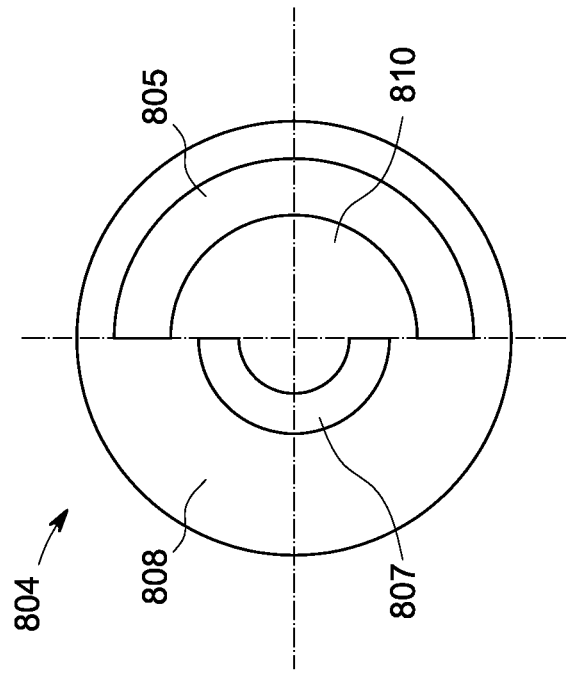
FIG. 8 is a diagram of a stationary valve and a rotary valve, in accordance with another embodiment of the invention.
Figure 8A:
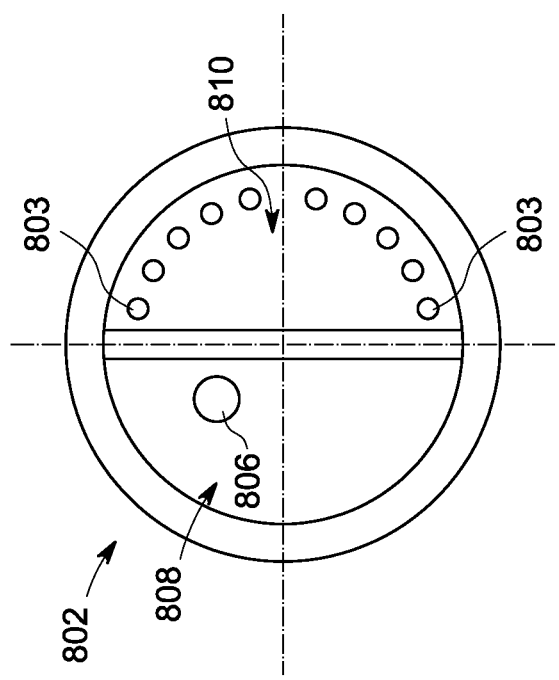
Figure 9A:
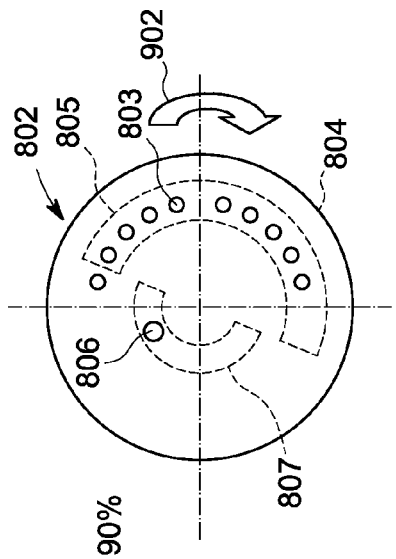
FIG. 9 is a diagram of exemplary operating positions of a rotary valve, in accordance with another embodiment of the invention.
Figure 9B:
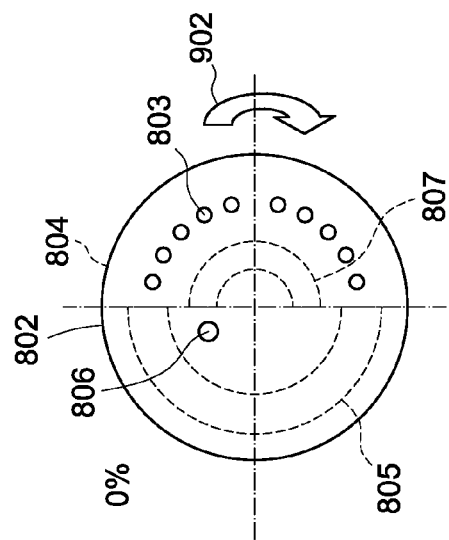
Figure 9C:
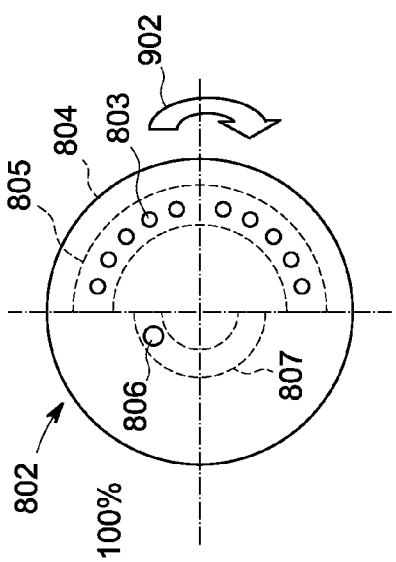
Figure 9D:
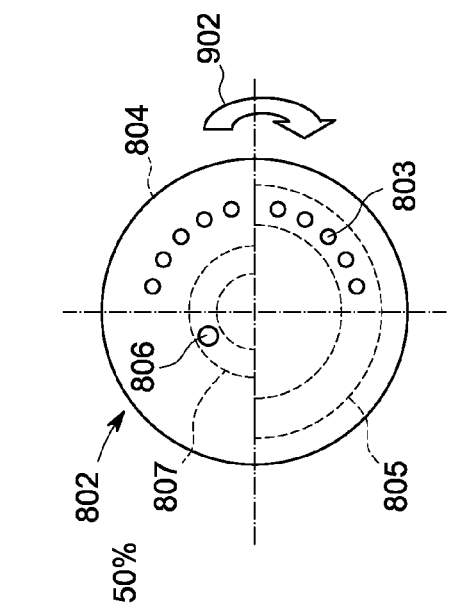

However, given that the inlet 704 and the outlet 706 of the device are both positioned on one side of the housing 702, the configuration of the stationary valve 708 and the rotary valve 710 will differ. Also, note that the inlet 704 is connected to an inlet chamber 709 and the outlet 706 is connected to an outlet chamber 711. The inlet chamber 709 and outlet chamber 711 are the formed spaces between the housing 702 and the stationary valve 708. The chambers are separated so as to prevent passage of refrigerant from the inlet chamber to the outlet chamber other than through the valves. FIG. 8 illustrates an embodiment of a stationary valve 802 in view 8(A) (corresponding to 708 in FIG. 7), and a rotary valve 804 in view 8(B) (corresponding to 710 in FIG. 7). Note that the view of the two valves in FIG. 8 is taken looking into the axial centerline in FIG. 7.

As shown, the stationary valve 802, in this embodiment, has two separated sinked-chambers, inlet chamber 808 (corresponding to 709 in FIG. 7) and outlet chamber 810 (corresponding to 711 in FIG. 7). The outlet chamber 810 has a plurality of holes 803 formed in the body of the valve; in this case, ten holes forming a semicircle. The rotary valve 804, in this embodiment, has a first slot 805 formed in the body of the valve; in this case forming a semicircle. The outlet holes 803 align with the outlet slot 805. Further, the inlet chamber 808 has an inlet hole 806 formed in the body of the valve. The rotary valve 804, in this embodiment, also has an inlet slot 807 formed in the body of the valve, forming a second semicircle. The inlet hole 806 aligns with the inlet slot 807. The radius of inlet hole 806 to the axial line of the stationary valve is offset from the radius of outlet holes 803 to the axial line of the stationary valve such that there is no overlap between inlet slot 807 and outlet slot 805 on the rotary valve. In FIG. 8, the openings (803 and 805) associated with the outlet chamber 810 are formed in a concentric circle that has a larger diameter than a diameter of a concentric circle along which the openings (806 and 807) associated with the inlet chamber 808 are formed. In an alternative embodiment, the concentric circle formed by openings (803 and 805) associated with the outlet chamber 810 could have a smaller diameter than a diameter of a concentric circle along which the openings (806 and 807) associated with the inlet chamber 808 are formed. In another alternative embodiment, the openings along each concentric circle could be swapped (exchanged).

FIG. 9 illustrates four exemplary operating positions to which the rotary valve 804 can be driven. It is to be understood that the rotary valve can be driven via the controller 208 in accordance with the step motor 712 and associated shaft 716 and rotor 714 in FIG. 7, as already explained above.

Like views A through D in FIG. 5, views A through D in FIG. 7 respectively illustrate 100 percent, 90 percent, 50 percent and 0 percent flow rate operating positions of the refrigerant flow control device. The outlet related openings 803 and 805 operate similar to 403 and 405 in FIG. 4. The difference here in the single ended design is that the inlet related openings 806 and 807 also operate in a similar manner. That is, as the rotary valve is stepped between operating positions, the hole 806 in the stationary valve aligns with the slot 807 allowing refrigerant to pass, until the operating position depicted in view 9(D) where the solid body of the rotary valve covers hole 806 thus blocking the flow of refrigerant. It is to be appreciated that, in an alternative embodiment, the holes and slots in the rotary and stationary valves may be swapped (exchanged).

Figure 10:
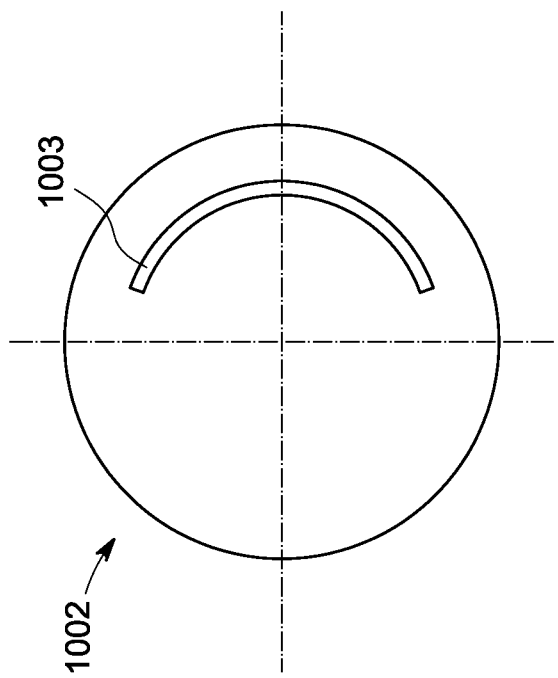
FIG. 10 is a diagram illustrating a stationary valve, in accordance with another embodiment of the invention.

Referring now to FIG. 10, an alternative embodiment of a stationary valve is shown. It is to be understood that the stationary valve 1002 in FIG. 10 is an alternative design with respect to the stationary valve 402 shown in FIG. 4. That is, rather than having a plurality of holes formed in the body of the stationary valve, a slot 1003 is formed. This slot is similar in shape to the slot 405 of rotary valve 404 in FIG. 4. In this manner, as the rotary valve rotates, as explained above, the slot 405 aligns with the slot 1003 to allow different amounts of refrigerant to pass, and thus different percentages of refrigerant flow to be realized by the refrigerant flow control device. However, by using continuous slots for the openings in both the stationary valve and the rotary valve, a continuous range of flow rate regulation between 100 percent and 0 percent is realized, as opposed to a step based regulation achieved with discrete holes. This continuous slot opening for the stationary valve can also be utilized in the single ended design shown in FIG. 8.

Figure 11:
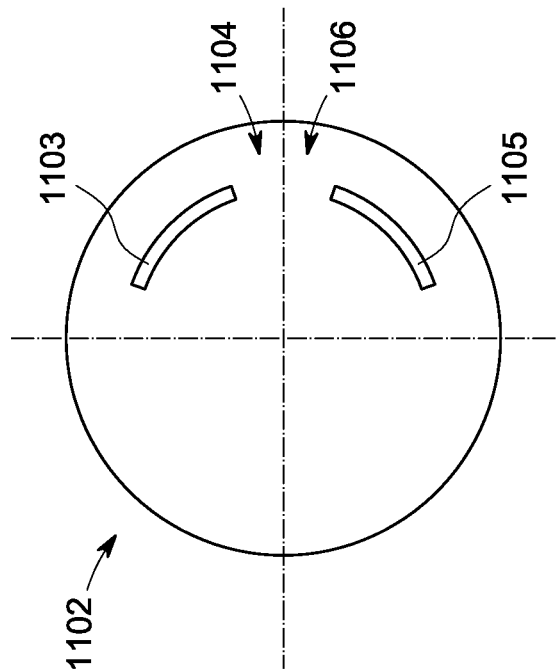
FIG. 11 is a diagram illustrating a stationary valve, in accordance with yet another embodiment of the invention.

Lastly, FIG. 11 illustrates an alternative embodiment of a stationary valve which can be used for refrigerant flow control devices with multiple outlets. That is, in addition to flow rate control, flow direction is also controlled by directing predetermined amounts of refrigerant (between 0 percent and 100 percent) to multiple evaporators. Thus, stationary valve 1102 is formed with a slot 1103 corresponding to one outlet chamber 1104 which feeds one of the device's outlets, and a slot 1105 corresponding to another outlet chamber 1106 which feeds the other of the device's outlets. This design can be employed on any of the devices shown in FIGS. 3, 6 and 7 such that said devices can be operated in a refrigeration system that includes two evaporators. Again, holes rather than slots can be employed if step based regulation is desired. Also, while only two outlets are depicted in FIG. 11, it is understood that principles of the invention are intended to cover valve designs which operate with more than two outlets. Further, valves for multiple inlet devices may be implemented in a similar manner.

It is to be appreciated that one skilled in the art will realize that well-known heat exchange and heat transfer principles may be applied to determine appropriate dimensions and materials of the various assemblies illustratively described herein, as well as flow rates of refrigerant that may be appropriate for various applications and operating conditions, given the inventive teachings provided herein. While methods and apparatus of the invention are not limited thereto, the skilled artisan will realize that such rates, dimensions and materials may be determined and selected in accordance with well-known heat exchange and heat transfer principles as described in R. K. Shah, "Fundamentals of Heat Exchanger Design," Wiley & Sons, 2003 and F. P. Incropera et al., "Introduction to Heat Transfer," Wiley & Sons, 2006, the disclosures of which are incorporated by reference herein.

It is to be further appreciated that the refrigeration systems described herein may have control circuitry including, but not limited to, a microprocessor (processor) that is programmed, for example, with suitable software or firmware, to implement one or more techniques as described herein. One example is refrigerant flow controller 208. In other embodiments, an ASIC (Application Specific Integrated Circuit) or other arrangement could be employed. One of ordinary skill in the art will be familiar with refrigeration systems and given the teachings herein will be enabled to make and use one or more embodiments of the invention; for example, by programming a microprocessor with suitable software or firmware to cause the refrigeration system to perform illustrative steps described herein. Software includes but is not limited to firmware, resident software, microcode, etc. As is known in the art, part or all of one or more aspects of the invention discussed herein may be distributed as an article of manufacture that itself comprises a tangible computer readable recordable storage medium having computer readable code means embodied thereon. The computer readable program code means is operable, in conjunction with a computer system or microprocessor, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer or processor to read instructions and data, such as magnetic variations on magnetic media or height variations on the surface of a compact disk. The medium can be distributed on multiple physical devices. As used herein, a tangible computer-readable recordable storage medium is intended to encompass a recordable medium, examples of which are set forth above, but is not intended to encompass a transmission medium or disembodied signal. A microprocessor may include and/or be coupled to a suitable memory.

Furthermore, it is also to be appreciated that methods and apparatus of the invention may be implemented in electronic systems under control of one or more microprocessors and computer readable program code, as described above, or in electromechanical systems where operations and functions are under substantial control of mechanical control systems rather than electronic control systems.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for controlling refrigerant flow, comprising:
   at least one refrigerant inlet;
   at least one refrigerant outlet;
   a first valve coupled between the at least one refrigerant inlet and the at least one refrigerant outlet; and
   a second valve coupled between the at least one refrigerant inlet and the at least one refrigerant outlet;
   wherein at least one of the first valve and the second valve is rotatable, and the first valve and the second valve comprise one or more cooperative openings to allow refrigerant to pass from the at least one refrigerant inlet, through the first valve and the second valve, and out of the at least one refrigerant outlet, and
   wherein the at least one of the first valve and the second valve is rotatable such that a rate of flow of refrigerant from the at least one refrigerant outlet is selectively:
   an approximately zero percent refrigerant flow rate;
   an approximately one hundred percent refrigerant flow rate; and
   at least one refrigerant flow rate between the approximately zero percent refrigerant flow rate and the approximately one hundred percent refrigerant flow rate.

2. The apparatus of claim 1, further comprising at least a second refrigerant outlet to allow refrigerant to pass from the at least one refrigerant inlet, through the first valve and the second valve, and out of one or more of the refrigerant outlets.

3. The apparatus of claim 2, further comprising at least a second refrigerant inlet to allow refrigerant to pass from one or more of the refrigerant inlets, through the first valve and the second valve, and out of one or more of the refrigerant outlets.

4. The apparatus of claim 1, further comprising a mechanism for rotating at least one of the first valve and the second valve in response to a control signal.

5. The apparatus of claim 1, wherein the one or more cooperative openings of the first valve and the second valve are formed therein such that selective alignment via rotation of at least one of the first valve and the second valve corresponds to selective rates of flow of refrigerant from the at least one refrigerant outlet.

6. The apparatus of claim, 5, wherein the first valve comprises a first set of one or more openings and the second valve comprises a second set of one or more openings.

7. The apparatus of claim 6, wherein at least one of the openings of the first set of one or more openings and the second set of one or more openings comprises a discrete hole feature.

8. The apparatus of claim 6, wherein at least one of the openings of the first set of one or more openings and the second set of one or more openings comprises a continuous slot feature.

9. The apparatus of claim 6, wherein selective alignment of at least one opening of the first set of one or more openings and at least one opening of the second set of one or more openings corresponds to one refrigerant flow rate between the approximately zero percent refrigerant flow rate and the approximately one hundred percent refrigerant flow rate.

10. The apparatus of claim 9, wherein selective alignment of others of the first set of one or more openings and the second set of one or more openings corresponds to other refrigerant flow rates between the approximately zero percent refrigerant flow rate and the approximately one hundred percent refrigerant flow rate.

11. The apparatus of claim 1, further comprising a housing.

12. The apparatus of claim 11, wherein the at least one refrigerant inlet and the at least one refrigerant outlet are formed along one axial line of the housing.

13. The apparatus of claim 11, wherein the at least one refrigerant inlet and the at least one refrigerant outlet are formed in perpendicular relation to one another on the housing.

14. The apparatus of claim 11, wherein the at least one refrigerant inlet and the at least one refrigerant outlet are formed on one side of the housing.

15. A refrigerator appliance comprising:
a refrigerant flow control device comprising: at least one refrigerant inlet; at least one refrigerant outlet; a first valve coupled between the at least one refrigerant inlet and the at least one refrigerant outlet; and a second valve coupled between the at least one refrigerant inlet and the at least one refrigerant outlet; wherein at least one of the first valve and the second valve is rotatable, and the first valve and the second valve comprise one or more cooperative openings to allow refrigerant to pass from the at least one refrigerant inlet, through the first valve and the second valve, and out of the at least one refrigerant outlet; and
a mechanism for rotating at least one of the first valve and the second valve in response to a control signal,
wherein the at least one of the first valve and the second valve is rotatable such that a rate of flow of refrigerant from the at least one refrigerant outlet is selectively:
an approximately zero percent refrigerant flow rate;
an approximately one hundred percent refrigerant flow rate; and
at least one refrigerant flow rate between the approximately zero percent refrigerant flow rate and the approximately one hundred percent refrigerant flow rate.

16. The refrigerator appliance of claim 15, further comprising a microprocessor for generating the control signal.

17. The refrigerator appliance of claim 16, wherein the microprocessor generates the control signal in response to an indication of an operating condition in the refrigerator appliance.

18. The refrigerator appliance of claim 15, wherein the mechanism rotates at least one of the first valve and the second valve so as to selectively align the one or more cooperative openings of the first valve and the second valve corresponding to selective rates of flow of refrigerant from the at least one refrigerant outlet.

19. The refrigerator appliance of claim 15, further comprising at least one evaporator, wherein the at least one refrigerant outlet is coupled to the at least one evaporator.

20. A method of controlling a flow of a refrigerant in an appliance, comprising:
directing a rotary valve to one or more flow rate operating positions in relation to a stationary valve;
wherein the rotary valve and the stationary valve comprise one or more cooperative openings to allow refrigerant to pass from a refrigerant inlet, through the rotary and stationary valves, and out of a refrigerant outlet so as to provide one or more refrigerant flow rates, and
wherein the one or more flow rate operating positions comprise:
an approximately zero percent refrigerant flow rate position;
an approximately one hundred percent refrigerant flow rate position; and
at least one refrigerant flow rate position between the approximately zero percent refrigerant flow rate and the approximately one hundred percent refrigerant flow rate.

* * * * *